US010689810B2

(12) United States Patent
Baum et al.

(10) Patent No.: US 10,689,810 B2
(45) Date of Patent: *Jun. 23, 2020

(54) EMBOSSED MULTI-PLY TISSUE PRODUCT

(71) Applicant: Kimberly-Clark Worldwide, Inc., Neenah, WI (US)

(72) Inventors: Tammy Lynn Baum, Neenah, WI (US); Benjamin Peter Sierra, Appleton, WI (US); James Leo Baggot, Menasha, WI (US); Eric Kent Isom, Jr., Appleton, WI (US)

(73) Assignee: KIMBERLY-CLARK WORLDWIDE, INC., Neenah, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/526,383

(22) Filed: Jul. 30, 2019

(65) Prior Publication Data
US 2019/0352853 A1  Nov. 21, 2019

Related U.S. Application Data

(62) Division of application No. 15/358,605, filed on Nov. 22, 2016, now Pat. No. 10,422,083.

(51) Int. Cl.
*D21H 27/02* (2006.01)
*D21H 27/00* (2006.01)
(Continued)

(52) U.S. Cl.
CPC .......... *D21H 27/02* (2013.01); *D21H 27/002* (2013.01); *D21H 27/005* (2013.01); *D21H 27/40* (2013.01);
(Continued)

(58) Field of Classification Search
CPC .. B32B 3/06; B32B 3/266; B32B 7/14; B32B 29/00; B32B 29/005; B32B 2250/02;
(Continued)

(56) References Cited

U.S. PATENT DOCUMENTS

| 3,867,225 A | 2/1975 | Nystrand |
| 4,320,162 A | 3/1982 | Schulz |

(Continued)

FOREIGN PATENT DOCUMENTS

| CN | 2715982 Y | 8/2005 |
| WO | 0108869 A1 | 2/2001 |

(Continued)

*Primary Examiner* — Seyed Masoud Malekzadeh
(74) *Attorney, Agent, or Firm* — Kimberly-Clark Worldwide, Inc.

(57) ABSTRACT

The present invention provides a method of producing a decorative tissue product, while controlling tensile degradation in a predicable fashion. The foregoing properties may be achieved using differential depth embossing in conjunction with an embossing pattern having particular characteristics. The use of an engraved roll, such as an embossing roll, having protuberances of differing depths and patterns not only improves the properties and characteristics of the fibrous structure, but may also be used to impart a unique pattern that provides the product with a distinctive look and is appealing to consumers. Generally the unique pattern results from a first set of protuberances having a first height and defining a first pattern and a second set of embossing elements having a second height and defining a second pattern, where the first height is greater than the second height.

11 Claims, 9 Drawing Sheets

(51) Int. Cl.
*D21H 27/40* (2006.01)
*B32B 3/06* (2006.01)
*B32B 29/00* (2006.01)
*B32B 7/14* (2006.01)
*B32B 3/26* (2006.01)

(52) U.S. Cl.
CPC ............ *B32B 3/06* (2013.01); *B32B 3/266* (2013.01); *B32B 7/14* (2013.01); *B32B 29/00* (2013.01); *B32B 29/005* (2013.01); *B32B 2250/02* (2013.01); *B32B 2307/726* (2013.01); *B32B 2432/00* (2013.01); *B32B 2554/00* (2013.01); *B32B 2555/00* (2013.01)

(58) Field of Classification Search
CPC .......... B32B 2307/726; B32B 2432/00; B32B 2554/00; B32B 2555/00; D21H 27/005; D21H 27/40; D21H 27/002; D21H 27/02
See application file for complete search history.

(56) References Cited

U.S. PATENT DOCUMENTS

| | | |
|---|---|---|
| 5,215,617 A | 6/1993 | Grupe |
| 5,356,364 A | 10/1994 | Veith et al. |
| 5,382,464 A | 1/1995 | Ruppel et al. |
| 5,830,558 A | 11/1998 | Barnholtz |
| 5,840,404 A | 11/1998 | Graff |
| 6,348,131 B1 | 2/2002 | Kershaw et al. |
| 6,368,539 B1 | 4/2002 | Greenfield et al. |
| 6,551,691 B1 | 4/2003 | Hoeft et al. |
| 6,572,722 B1 | 6/2003 | Pratt |
| 8,119,223 B2 * | 2/2012 | Morin ............ B31F 1/07 428/153 |
| 9,205,623 B2 | 12/2015 | Barredo |
| 2007/0264461 A1 * | 11/2007 | Gelli ............ B32B 3/06 428/43 |
| 2015/0165716 A1 | 6/2015 | Logiodice |
| 2015/0225903 A1 | 8/2015 | Jeannot et al. |
| 2015/0247290 A1 | 9/2015 | Burazin et al. |
| 2015/0352801 A1 | 12/2015 | Margo Moreno |
| 2015/0354142 A1 | 12/2015 | Gambini |
| 2016/0002861 A1 | 1/2016 | Goulet et al. |

FOREIGN PATENT DOCUMENTS

| | | |
|---|---|---|
| WO | 02103112 A1 | 12/2002 |
| WO | 07097725 A2 | 8/2007 |

* cited by examiner

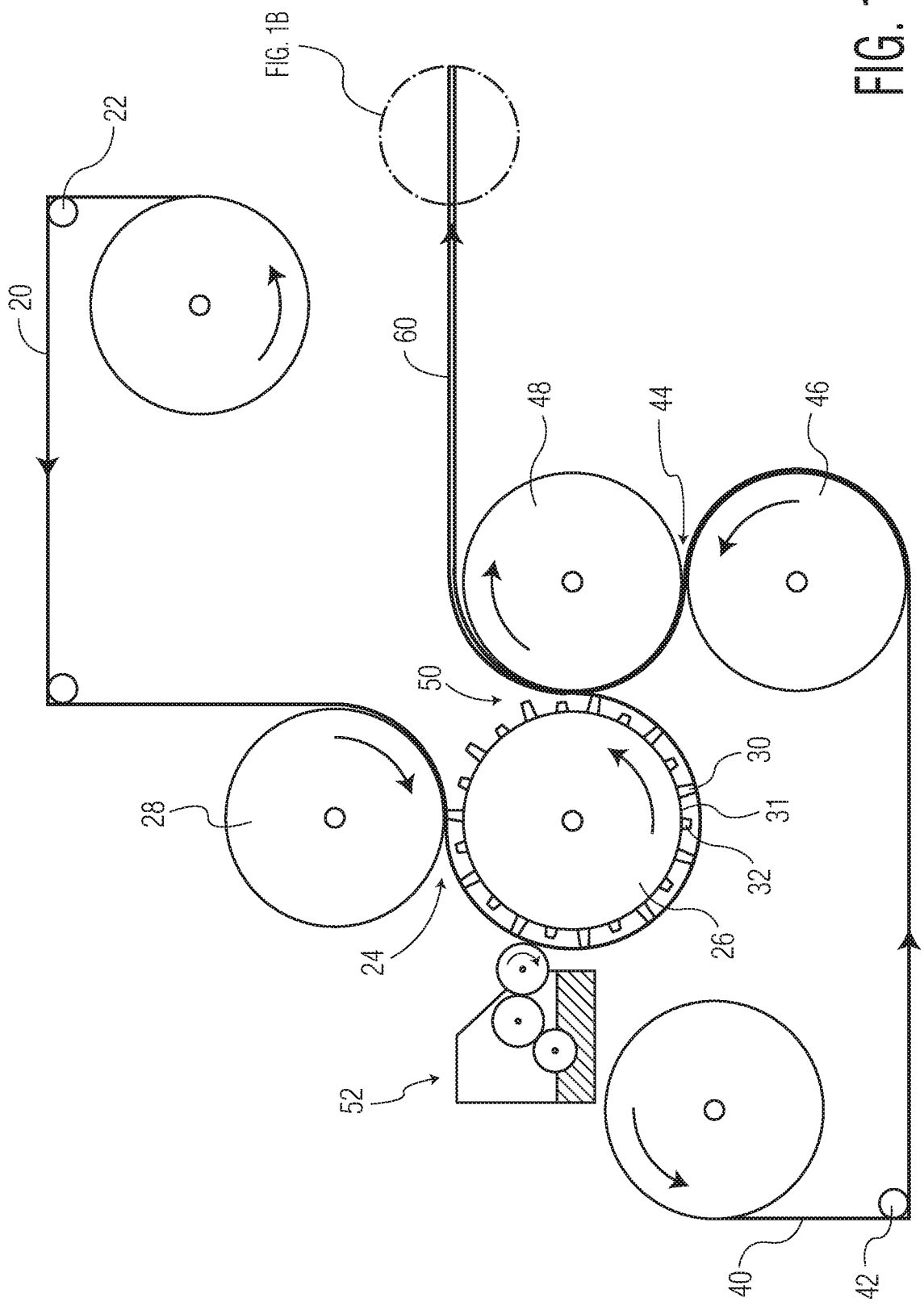

EMBOSSED MULTI-PLY TISSUE PRODUCT

RELATED APPLICATIONS

The present application is a divisional application and claims priority to U.S. patent application Ser. No. 15/358,605, filed on Nov. 22, 2016, now issued as U.S. Pat. No. 10,422,083 which is incorporated herein by reference.

BACKGROUND OF THE DISCLOSURE

It is well known in the art to utilize embossing to decorate and thicken tissue products. A few examples of using embossing in this manner are disclosed, for example, in U.S. Pat. No. 2,043,351 to Fourness, U.S. Pat. No. 4,189,344 to Busker, and U.S. Pat. No. 5,356,364 to Veith. Using embossing to increase sheet caliper (thicken), has allowed bathroom tissue producers to reduce the number of sheets within the roll while retaining the same package size (roll diameter). This has been a common practice in the bathroom tissue market for many years, particularly for household tissue products sold at grocery stores.

One means of imparting bathroom tissue with a decorative embossment, referenced in U.S. Pat. No. 4,659,608 to Schultz, is commonly referred to as "spot embossing." Spot embossing generally involves discrete embossing elements that are about ½ inch by ½ inch to about 1 inch by 1 inch in size (about 0.25 to about 1 square inch in surface area). These discrete spot embossing elements are spaced about ½ inch to about 1 inch apart. They are typically engraved in a steel roll about 0.060 inch in relief. In most cases spot embossing is carried out with a steel engraved roll (male elements) and a rubber covered backing roll. The design of spot embossing patterns covers a wide range of decorative shapes such as, for example, flowers, butterflies, geometric shapes and patterns, logos and trademarks. Spot embossing is commonly used not only to decorate, but also to increase sheet caliper.

While the prior art embossing methods are useful for decorating and thickening tissue products, they may be limited in their ability to affect other important product properties, such as tensile strength. This is particularly true when attempting to balance both decorating the tissue and modulating its strength. Therefore there is a need for a method of embossing soft, thick tissue sheets which provides a lasting embossing pattern in tissue sheets, but which also degrades the sheets tensile in a controlled and predictable fashion.

SUMMARY OF THE DISCLOSURE

It has now been surprisingly discovered that the tensile strength of a fibrous structure may be reduced, and hence softness increased, during converting of the tissue web by subjecting the tissue web to a unique embossing process. The process generally reduces the tensile strength, measured as geometric mean tensile (GMT), of the resulting tissue product by at least about 15 percent and more preferably at least about 18 percent and still more preferably at least about 20 percent, such as from about 15 to about 25 percent. The reduction in tensile strength is generally accompanied by a commensurate increase in softness. The reduction in tensile and the increase in softness, however, are generally achieved without negatively affecting other important tissue product properties such as sheet bulk. Further, the process generally imparts the tissue product with a decorative pattern.

The novel embossing process relies upon an engraved roll having a first embossing element extending radially therefrom and forming a first embossing pattern and a second embossing element extending radially therefrom and forming a second embossing pattern, wherein the first element has a greater radial height than the second element. Further, the height of the second element is such that the pattern defined by the element is not embossed upon a web treated therewith. Rather, the resulting web bears only an embossment corresponding to the first pattern. In this manner the tensile strength of the web may be degraded, but the web is only imparted with a single embossment pattern.

Accordingly, in one embodiment the present invention provides a method for embossing a fibrous structure having a plurality of fibrous web layers comprising the steps of providing a first and a second fibrous material web; providing an engraved roll having a first axis of rotation, the engraved roll comprising at a first embossing element extending radially therefrom and forming a first embossing pattern and a second embossing element extending radially therefrom and forming a second embossing pattern, wherein the first element has a greater radial height than the second element; providing an impression roll having a second axis of rotation and comprising a resilient surface engaging the at least one first element of the first roll so as to form a first nip there-between as the first and second rolls rotate relative to each other so as to bring the at least one first element into engagement with the resilient surface; passing the first fibrous web through the first nip; forming a first embossment in the first web by pressing the first web between the first element and the resilient surface of the impression roll as the first web passes through the first nip and wherein pressing the first web between the second element and the resilient surface of the impression roll does not form a lasting embossment; providing a marrying roll having a third axis of rotation and a having a substantially smooth surface engaging the at least one first element of the first roll so as to form a second nip there-between; passing the first and the second webs through the second nip thereby forming a two-ply fibrous product having an embossment in the pattern of the first embossing element.

In another embodiment the present invention provides an embossed fibrous product made according to the foregoing method, the product having a GMT from about 1,000 to about 1,500 g/3" and more preferably from about 1,000 to about 1,200 g/3" and a sheet bulk greater than about 10.0 cc/g, such as from about 10.0 to about 20.0 cc/g. In a particularly preferred embodiment the product has a first embossed pattern comprising a plurality of linear elements, the linear elements defining discrete land areas there-between, wherein the land areas are unembossed.

In yet another embodiment the present invention provides a method of reducing the tensile strength of a multi-ply fibrous structure comprising the steps of providing a first and a second fibrous material web; providing an engraved roll having a first axis of rotation, the engraved roll comprising at least one first embossing element extending radially therefrom and forming a first embossing pattern and a second embossing element extending radially therefrom and forming a second embossing pattern, wherein the first element has a greater radial height than the second element; providing an impression roll having a second axis of rotation and comprising a resilient surface engaging the at least one first element of the first roll so as to form a first nip there-between as the first and second rolls rotate relative to each other so as to bring the at least one first element into engagement with the resilient surface; passing the first fibrous web through the first nip; forming a first embossment in the first web by pressing the first web between the first element and the resilient surface of the impression roll as the first web passes through the first nip and wherein pressing the first web between the second element and the resilient surface of the impression roll does not form a lasting embossment; providing a marrying roll having a third axis of rotation and having a substantially smooth surface engaging the at least one first element of the first roll so as to form a second nip there-between; passing the first and the second webs through the second nip thereby forming a two-ply fibrous product having an embossment in the pattern of the first embossing element; wherein the geometric mean tensile strength (GMT) of the two-ply fibrous product is at least about 20 percent less than a substantially identical unembossed two-ply fibrous product.

In still other embodiments the present invention provides an embossed fibrous product made according to the foregoing method, the product having a GMT from about 1,000 to about 1,200 g/3" and a sheet bulk greater than about 10.0 cc/g.

In yet other embodiments the invention provides an embossed fibrous product made according to the foregoing method wherein the embossment covers at least about 10 percent, and more preferably at least about 15 percent, of the product surface area and wherein the embossment has a depth of at least about 0.5 mm, and more preferably at least about 0.75 mm, such as from about 0.5 to about 1.5 mm.

Definitions

As used herein the term "Fibrous Structure" refers to a structure comprising a plurality of elongated particulate having a length to diameter ratio greater than about 10 such as, for example, papermaking fibers and more particularly pulp fibers, including both wood and non-wood pulp fibers, and synthetic staple fibers. A non-limiting example of a fibrous structure is a tissue web comprising pulp fibers.

As used herein the term "Basesheet" refers to a fibrous structure provided in sheet form that has been formed by any one of the papermaking processes described herein, but has not been subjected to further processing to convert the sheet into a finished product, such as embossing, calendering, perforating, plying, folding, or rolling into individual rolled products.

As used herein the term "Tissue Web" or "Tissue Ply" refers to a fibrous structure provided in sheet form and being suitable for forming a tissue product.

As used herein the term "Tissue Product" refers to products made from tissue webs and includes, bath tissues, facial tissues, paper towels, industrial wipers, foodservice wipers, napkins, medical pads, and other similar products. Tissue products may comprise one, two, three or more plies.

As used herein the term "Ply" refers to a discrete tissue web used to form a tissue product. Individual plies may be arranged in juxtaposition to each other.

As used therein, the term "Background Surface" generally refers to the predominant overall surface of a fibrous structure, excluding the portions of the surface that are occupied by embossing elements.

As used herein, the term "Surface Plane" generally refers to the plane formed by the highest points of an object, such as an engraved roll, a fibrous structure or a tissue product. The surface plane may be determined by imaging a cross-section of the object, such as a fibrous structure, and drawing a line tangent to the highest point of its upper surface where the line is generally parallel to the x-axis of the objects surface and does not intersect any portion of the object.

As used herein the term "Pattern" generally refers to the arrangement of one or more design elements. Within a given pattern the design elements may be the same or may be different, further the design elements may be the same relative size or may be different sizes. For example, in one embodiment, a single design element may be repeated in a pattern, but the size of the design element may be different from one design element to the next within the pattern.

As used herein the term "Motif" generally refers to the recurrence of one or more design elements within a pattern. The recurrence of the design element may not necessarily occur within a given sheet, for example, in certain embodiments the design element may be a continuous design element extending across two adjacent sheets separated from one another by a line of perforations. Motifs are generally non-random repeating units that form a pattern.

As used herein, the term "Embossing Pattern" generally refers to a decorative shape disposed across at least one dimension of a fibrous structure surface, the pattern may comprise a line element, discrete elements or other shapes. The embossing pattern comprises a portion of the fibrous structure lying out of plane with the surface plane of the fibrous structure. In general, the embossing pattern results from embossing the fibrous structure resulting in a depressed area having a z-directional elevation that is lower than the surface plane of the fibrous structure. The depressed areas can suitably be one or more linear elements, discrete elements or other shapes.

As used herein, the term "Embossment Plane" generally refers to the plane formed by the upper surface of the depressed portion of the fibrous structure forming the embossment. Generally the embossing element plane lies below the fibrous structure's surface plane. In certain embodiments the fibrous structure of the present invention may have a single embossing element plane, while in other embodiments the structure may have multiple embossing element planes. The embossing element plane is generally determined by imaging a cross-section of the fibrous structure and drawing a line tangent to the upper most surface of an embossment where the line is generally parallel to the x-axis of the fibrous structure.

As used herein the terms "Protuberance" and "Embossing Element" generally refer to any protuberance, boss, lug, finger, head, step, surface, or the like, having a z-directional height when measured from the axis of the roll, or some other common reference point. Generally the height is measured from the "base surface" of the roll, which is understood to be the circumferential surface of the roll having the least radial height when measured from the axis of the roll, or some other common reference point. In this way, a roll having an outer circumferential surface of three different radial heights, when measured from the axis of the roll, should be understood as having a base surface and a first and second element, which correspond to the three surfaces respectively. One of skill in the art should also understand that the roll could also include more than two different types of elements, and that the disclosure of a first and second element is meant to be illustrative, rather than limiting. In any event, rolls of the present invention generally comprise at least two elements with different heights where only the taller of the two elements forms an embossment in a fibrous structure processed there-with.

As used herein the term "Line Element" refers to an element, such as an embossing element, in the shape of a line, which may be continuous, discrete, interrupted, and/or a partial line with respect to a fibrous structure on which it is present. The line element may be of any suitable shape such as straight, bent, kinked, curled, curvilinear, serpentine, sinusoidal, and mixtures thereof that may form a regular or irregular, periodic or non-periodic lattice work of structures wherein the line element exhibits a length along its path of at least 10 mm. In one example, the line element may comprise a plurality of discrete elements, such as dots and/or dashes for example, that are oriented together to form a line element.

As used herein the term "Continuous Element" refers to an element, such as an embossing element, disposed on a fibrous structure that extends without interruption throughout one dimension of the fibrous structure.

As used herein the term "Discrete Element" refers to an element, such as an embossing element, disposed on a fibrous structure that does not extend continuously in any dimension of the fibrous structure.

As used herein the term "Basis Weight" (BW) generally refers to the bone dry weight per unit area of a tissue and is generally expressed as grams per square meter (gsm). Basis weight is measured using TAPPI test method T-220. While basis weight may be varied, tissue products prepared according to the present invention generally have a basis weight greater than about 10 gsm, such as from about 10 to about 80 gsm and more preferably from about 30 to about 60 gsm.

As used herein, the term "caliper" is the representative thickness of a single sheet (caliper of tissue products comprising two or more plies is the thickness of a single sheet of tissue product comprising all plies) measured in accordance with TAPPI test method T402 using a ProGage 500 Thickness Tester (Thwing-Albert Instrument Company, West Berlin, N.J.). The micrometer has an anvil diameter of 2.22 inches (56.4 mm) and an anvil pressure of 132 grams per square inch (per 6.45 square centimeters) (2.0 kPa). The caliper of a tissue product may vary depending on a variety of manufacturing processes and the number of plies in the product, however, tissue products prepared according to the present invention generally have a caliper greater than about 100 µm, more preferably greater than about 200 µm and still more preferably greater than about 300 µm, such as from about 100 to about 1,000 µm.

As used herein the term "Sheet Bulk" refers to the quotient of the caliper (generally having units of µm) divided by the bone dry basis weight (generally having units of gsm). The resulting sheet bulk is expressed in cubic centimeters per gram (cc/g). While sheet bulk may vary depending on any one of a number of factors, tissue products prepared according to the present invention may have a sheet bulk greater than about 5.0 cc/g, more preferably greater than about 10.0 cc/g and still more preferably greater than about 12.0 cc/g, such as from about 5.0 to about 20.0 cc/g.

As used herein, the term "Geometric Mean Tensile" (GMT) refers to the square root of the product of the machine direction tensile strength and the cross-machine direction tensile strength of the tissue product. While the GMT may vary, tissue products prepared according to the present invention may have a GMT greater than about 1,000 g/3".

As used herein, the term "Stretch" generally refers to the ratio of the slack-corrected elongation of a specimen at the point it generates its peak load divided by the slack-corrected gauge length in any given orientation. Stretch is an output of the MTS TestWorks™ in the course of determining the tensile strength as described in the Test Methods section herein. Stretch is reported as a percentage and may be reported for machine direction stretch (MDS), cross-machine direction stretch (CDS) or as geometric mean stretch (GMS), which is the square root of the product of machine direction stretch and cross-machine direction stretch. While the stretch of tissue products prepared according to the present invention may vary, in certain embodiments tissue products prepared as disclosed herein have a GMS greater than about 5 percent, more preferably greater than about 10 percent and still more preferably greater than about 12 percent.

As used herein, the term "Slope" refers to slope of the line resulting from plotting tensile versus stretch and is an output of the MTS TestWorks™ in the course of determining the tensile strength as described in the Test Methods section herein. Slope is reported in the units of grams (g) per unit of sample width (inches) and is measured as the gradient of the least-squares line fitted to the load-corrected strain points falling between a specimen-generated force of 70 to 157 grams (0.687 to 1.540 N) divided by the specimen width. Slopes are generally reported herein as having units of grams (g) or kilograms (kg).

As used herein, the term "Geometric Mean Slope" (GM Slope) generally refers to the square root of the product of machine direction slope and cross-machine direction slope. GM Slope generally is expressed in units of kilograms (kg). While the GM Slope may vary, tissue products prepared according to the present invention may have a GM Slope less than about 20 kg, and more preferably less than about 15 kg and still more preferably less than about 10 kg.

BRIEF DESCRIPTION OF THE DRAWINGS

FIG. 1A is a schematic illustration of an apparatus for embossing a tissue product in accordance with one aspect of the present invention and FIG. 1B is a detailed view of a two-ply tissue product resulting from use of the apparatus;

DETAILED DESCRIPTION OF THE DISCLOSURE

Figure 1B:
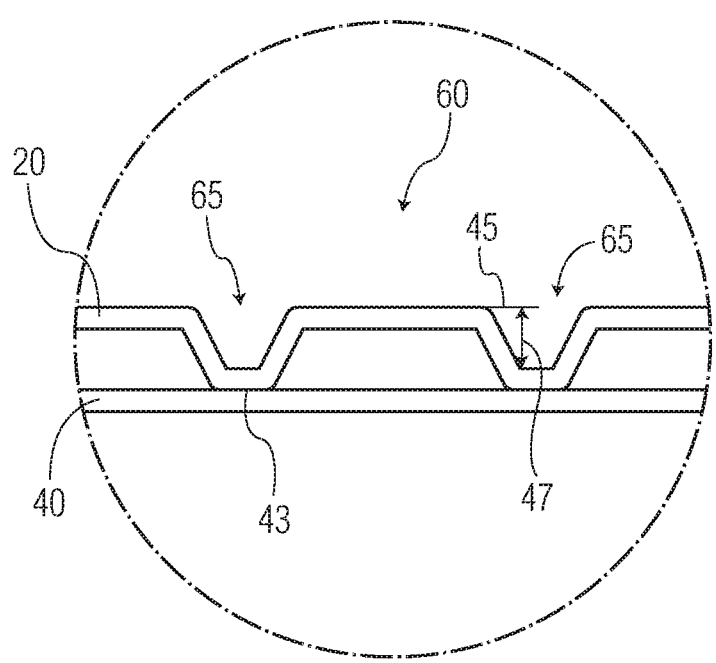

The present inventors have now discovered that the tensile strength of a fibrous structure may be reduced, and hence softness increased, during converting of the tissue web by subjecting the tissue web to a unique embossing process. The process generally reduces the tensile strength, measured as geometric mean tensile (GMT), of the resulting tissue product by at least about 15 percent and more preferably at least about 18 percent and still more preferably at least about 20 percent, such as from about 15 to about 25 percent. The reduction in tensile strength is generally accompanied by a commensurate increase in softness. The reduction in tensile and the increase in softness, however, are generally achieved without negatively affecting other important tissue product properties such as sheet bulk.

The improved properties and characteristics of the fibrous structures of the present invention, such as a multi-ply tissue product, may be achieved using differential depth embossing in conjunction with an embossing pattern having particular characteristics. The use of an engraved roll, such as an embossing roll, having protuberances of differing depths and, in certain embodiments, different patterns, not only improves the properties and characteristics of the fibrous structure, but may also be used to impart a unique pattern that provides the product with a distinctive look and is appealing to consumers. Generally the unique pattern results from a first set of protuberances, also referred to herein as embossing elements, having a first height and defining a first pattern. The embossing roll further comprises a second set of embossing elements having a second height and defining a second pattern. Generally the height of the first set of protuberances is greater than the height of the second set of protuberances.

When used to emboss a fibrous structure, the disclosed engraved roll applies an embossed pattern corresponding to the first embossing elements to the resulting product, while the second set of embossing elements do not impart a pattern to the product. Rather than apply an embossed pattern to the product, the second set of embossing elements simply disrupts a portion of the fibrous structure's fiber-fiber bonding and weakens the fibrous structure to decrease its tensile strength.

Further, in certain embodiments, the foregoing engraved roll may be used in an embossing process that includes an adhesive lamination step such that when two fibrous plies are nested together, the plies become contact laminated to one another through an intermediate adhesive selectively applied in a pattern corresponding to the first embossing elements. The second set of embossing elements, being reduced in height compared to the first set of embossing elements do not impart sufficient structure to the tissue product to be contacted by the adhesive and laminated. As such, the degree of lamination, and any resulting product stiffening may be limited, while still achieving the desired degree of tensile degradation.

In the present invention, the embossed pattern is configured so that the first embossing pattern has a height that is at least about 15 percent greater than a second embossing pattern, more preferably at least about 20 percent greater, such as from about 15 to about 50 percent greater and more preferably from about 20 to about 45 percent greater and still more preferably from about 17.5 to about 40 percent greater. Further, in certain preferred embodiments, the first and second embossing patterns may have different patterns. For example, the first embossing pattern may comprise linear elements, which may be discrete or continuous, and the second embossing pattern may comprise non-linear elements. The combination of the differential depth embossing and the particular characteristics of the embossed pattern together results in a multi-ply tissue product having increased softness and improved bulk and emboss definition as compared to other known tissue products.

The multi-ply tissue product according to the present invention may be manufactured using the apparatus shown in FIG. 1. To produce the differential depth embossed tissue, a first tissue ply 20 is conveyed past a series of idler rollers 22 towards the nip 24 that is located between an engraved roll 26 and an impression roll 28. The engraved roll 26 rotates in the counterclockwise direction while the impression roll 28 rotates in the clockwise direction. The first tissue ply 20 forms the top ply in the resulting embossed multi-ply tissue product 60.

The engraved roll 26 is generally a hard and non-deformable roll, such as a steel roll. The impression roll 28 may be a substantially smooth roll and more preferably a smooth roll having a covering, or made of, natural or synthetic rubber, for example, polybutadiene or copolymers of ethylene and propylene or the like. In a preferred embodiment of the present invention, the impression roll 28 has a hardness greater than about 40 Shore (A), such as from about 40 to about 100 Shore (A) and more preferably from about 40 to about 80 Shore (A). By providing a receiving roll with such hardness, the designs of the engraved roll are not pressed into the impression roll as deep as in conventional apparatuses. Consequently, in those regions of the tissue web contacted by the lower embossing elements, such as those forming the second embossing pattern, the tissue web is subject to less compression and the second embossing pattern is generally not imparted to the resulting tissue product.

The impression roll 28 and engraved roll 26 are urged together to form a nip 24 through which the web 20 passes to impose an embossed pattern on the web. The engraved roll 26 comprises first 30 and second 32 protuberances or embossing elements extending radially therefrom. The first and second protuberances are arranged so as to form a first and a second embossing pattern. The first protuberances 30 have a first radial height (h1) and the second protuberances 32 have a second radial height (h2) where h1 is greater than h2. Generally the height is measured from the "base surface" of the roll, which is understood to be the circumferential surface of the roll having the least radial height when measured from the axis of the roll, or some other common reference point. In this way, a roll having an outer circumferential surface of three different radial heights.

In certain embodiments h1 may be about 15 percent greater than h2, such as from about 15 to about 50 percent greater and more preferably from about 20 to about 40 percent greater. For illustrative purposes, the protuberances 30, 32 of FIG. 1 are exaggerated in comparison to the size of the engraved roll 26. In certain preferred embodiments h1 is greater than about 1.30 mm, such as from about 1.30 to about 1.50 mm and more preferably from about 1.35 to about 1.45 mm. On the other hand, h2 is generally less than about 1.25 mm, such as from about 0.90 to about 1.25 mm, and more preferably from about 0.95 to about 1.20 mm.

Typically the engraved roll will include many more protuberances than that shown in FIG. 1. Further, the engraved roll may include additional protuberances forming a third or a fourth embossing pattern. In a particularly preferred embodiment the engraved roll comprises a third and a fourth set of protuberances arranged in a third and a fourth pattern, where the third and fourth protuberances have a height equal to or less than the height of the second protuberances (i.e., h2) so as not to alter the design imparted by the first protuberances. The shape of the protuberances and the resulting embossed design, if any, will be discussed in more detail below. In a particularly preferred embodiment, however, the first and second protuberances form a first and a second pattern where the patterns are different. For example, the first embossing elements comprise linear elements, which may be continuous or discontinuous, which form a curvilinear pattern that extends across at least one dimension of the engraved roll and the second embossing elements comprise non-linear elements that form discrete geometric patterns, such as diamonds.

Regardless of the specific design formed by protuberances of the first and second embossing patterns, the height from which the protuberances extend from the surface of the engraved roll differs. The difference in height is such that the resulting fibrous structure, such as a two-ply tissue product, has a design corresponding to the pattern formed by the first protuberances but does not bear a second design corresponding to the second protuberances. While the second protuberances do not impart a design to the resulting product, the protuberances do aid in reducing fiber-fiber bonding, which aids in the reduction of product tensile strength.

With continued reference to FIG. 1, force or pressure is applied to one or both of the rolls 26, 28, such that the rolls 26, 28 are urged against one another to form a nip 24 there-between. The pressure will cause the impression roll 28 to deform about the protuberances 30, 32, such that when the web 20 is pressed about the protuberances 30, 32 and onto the landing areas 31 (i.e. the outer surface areas of the roll surrounding the protuberances) an embossment 65 results (illustrated in FIG. 1B).

To form a two-ply tissue product, a second tissue ply 40 is conveyed around an idler roller 42 and is then passed into a nip 44 located between a substantially smooth roll 46 which may be made of rubber and a marrying roll 48, which may be a steel roll. The second tissue ply 40 is adapted to form the bottom ply in the resulting multi-ply tissue product 60. As it is conveyed, the second tissue ply 40 passes through a second nip 50 created between the engraved roll 26 and the marrying roll 48 where it is brought into contact with the first tissue ply 20, which now bears an embossment 65 as a result of being embossed by the engraved roll 26. The first and second plies 20, 40 are joined together as they pass through the nip 50 to form a multi-ply tissue product 60.

With continued reference to FIG. 1, in certain embodiments, after the first tissue ply 20 passes through the nip 24 between the engraved roll 26 and the impression roll 28, a gluing unit 52 applies glue to the distal ends 43 of the embossments 65 (illustrated in detail in FIG. 1B) that are formed on the exterior surface of the embossed first tissue ply 20 by virtue of embossing by the first protuberances 30. The embossed first tissue ply 20 with the applied glue then advances further to a nip 50 between the engraved roll 26 and the marrying roll 48. At this point, the unembossed second ply 40 is attached to the embossed first ply 20 and are then conveyed around a marrying roll 48 to form a two-ply tissue product 60 which is subsequently wound into a roll (not shown).

As illustrated in FIG. 1B, the resulting two-ply tissue product 60 comprises the first and second plies 20, 40, where the first ply 20, which forms the top ply of the tissue product 60, bears an embossment 65, but the second ply 40 has not been heavily embossed and generally does not have a distinct embossment. Thus, in this manner, the first tissue ply 20 is embossed whereas the second ply 40 is unembossed. The degree to which the first tissue ply 20 is embossed can be achieved in several ways. For example, the impression roll 28 can be made of materials having different degrees of softness to allow a higher penetration depth of the first and second protuberances 30, 32. Alternatively the pressure at the nip 24 between the engraved roll 26 and the impression roll 28 may be varied.

With further reference to FIG. 1B, the embossment 65 generally is in the form of a depression below the surface plane 45 of the first ply 20. The embossment 65 may have a depth 47, which is generally measured from the surface plane 45. The bottom surface plane 43 of the first ply 20 is generally defined by the distal end of the embossment 65 and may, in certain embodiments form the interface between the first 20 and second 40 plies.

Figure 2A:
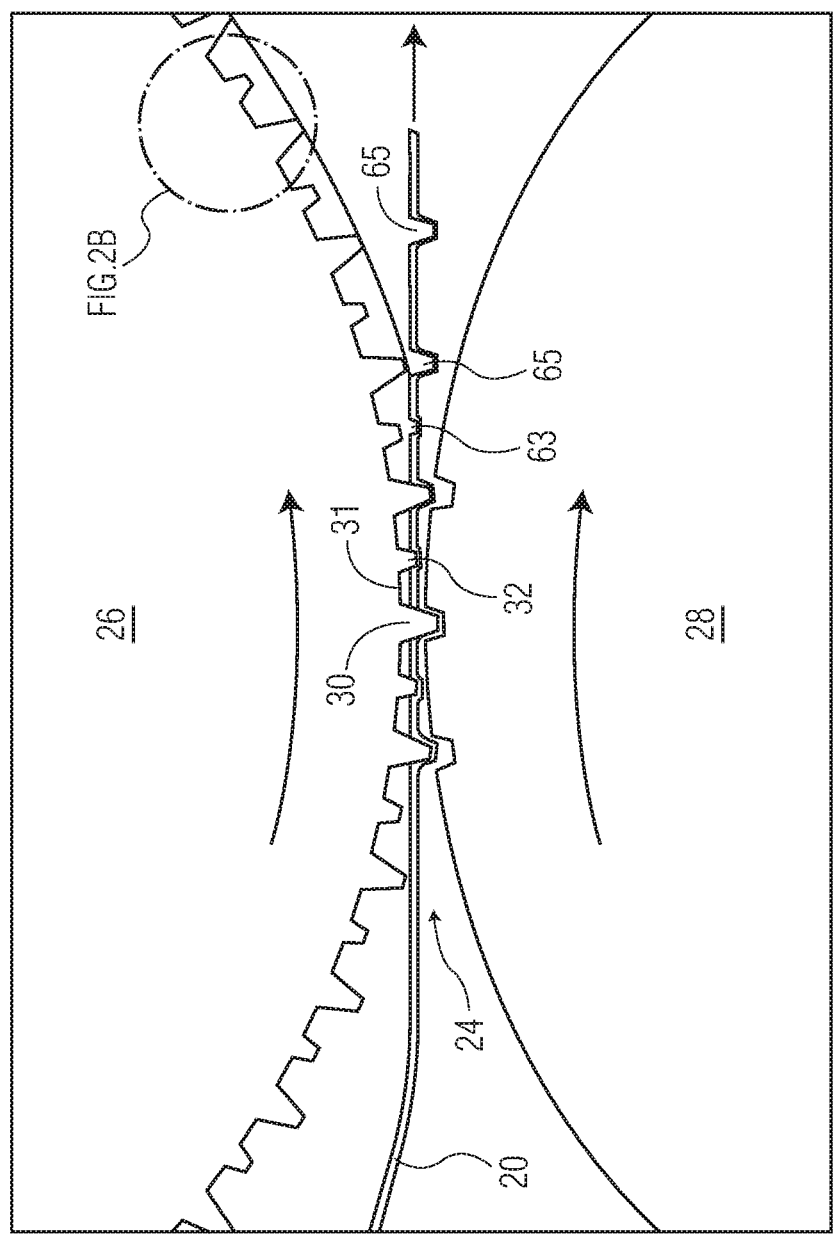
FIG. 2A is a front view of the roller arrangement used in the apparatus shown in FIG. 1A

Turning now to FIG. 2A, which illustrates in further detail the nip 24 formed between the engraved roll 26 the impression roll 28. FIG. 2A also illustrates one example of the pattern of protuberances 30, 32 engraved on the engraved roll 26 that has been found useful in the production of multi-ply tissue products such as tissues having better strength degradation and increased perceived softness with better emboss definition. The characteristics of the emboss pattern and the way in which such characteristics contribute to the overall advantageous attributes of the multi-ply tissue will be discussed in more detail below.

FIG. 2A generally illustrates embossing of the first tissue ply 20, which will be subsequently joined to a second tissue ply, such as an unembossed second tissue ply, to form the multi-ply tissue product of the present invention. The engraved roll 26 is engraved with first 30 and second 32 protuberances having different heights. The different heights (h1 and h2) results in a first tissue ply 20 having embossments of different depths (illustrated as embossments 63 and 65 in detailed view FIG. 2B). The shallower embossments 63, imparted by the second protuberances 32, which are shorter in height compared to the first protuberances 30, are transient however, and generally do not impart a lasting embossment to the first tissue ply 20 or the resulting two-ply tissue product 60. Rather, the embossing pattern of the two-ply tissue product is generally provided solely by the deeper embossments 65 formed by the first protuberances 30.

As can be seen in FIG. 2A, as the first tissue ply 20 leaves the nip 24, it may have first and second embossments 63, 65. Preferably however, the embossments 63 formed by the second protuberance 32 are shallow, and the first tissue ply is sufficiently resilient and compressive resistant, that the embossments 63 are transient and do not impart a lasting embossment to the ply and are not visible in the finished two-ply product. Without being bound by any particular theory, it is believed that treatment of the first tissue ply in this manner, reduces the strength (measured as GMT) of the ply, thus improving its softness, without negatively affecting other important sheet properties. On the other hand, the embossment 65, which is formed by the first protuberances 30, is lasting and does impart the finished two-ply tissue product with an embossing design. Thus, a multi-ply tissue product produced according to the present invention possesses better perceived softness and bulk along with better emboss definition, and will also possess desirable strength characteristics by virtue of the transient embossments imparted by the second protuberances.

Figure 2B:
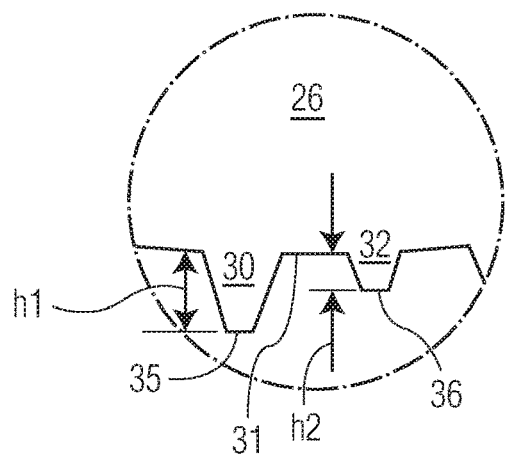
FIG. 2B is a detailed view of a portion of the engraved roll of FIG. 2A.

With reference now to FIG. 2B, the engraved roll 26 comprises first and second protuberances 30, 32, which are separated from one another by land areas 31. The first and second protuberances 30, 32 have distal ends 35, 36 spaced away from the land areas 31. The vertical distance (h1) between the land areas 31 and the distal end 35 of the first protuberance 30 is generally greater than the vertical distance (h2) between the land areas 31 and the distal end 36 of the second protuberance 32. As noted previously, the difference in height between h1 and h2 is generally at least about 15 percent, more preferably at least about 20 percent, such as from about 15 to about 50 percent and more preferably from about 20 to about 45 percent and still more preferably from about 17.5 to about 40 percent.

In certain embodiments, to improve processability and one or more physical properties, one or more of the fibrous plies may be subjected to preconditioning to impart moisture and/or heat to the tissue plies prior to entering an embossing nip. For example, preconditioning mechanisms may be positioned upstream of the nip located between the engraved roll and the impression role to introduce moisture and/or heat to the first tissue ply prior to embossing. Methods and arrangements for applying moisture and heat (e.g., steam) to tissue webs are known to skilled artisans, and can be employed and fall within the scope of the present invention. By way of example, steam can be applied to either or both sides of a web prior to embossing.

Engraved rolls useful in the present invention not only have protuberances of differing height, the protuberances are generally arranged in such a manner so as to define at least a first and a second pattern. Generally, the first pattern comprises one or more motifs comprising linear elements, and more preferably continuous line elements, where the linear elements are spaced apart from one another to form land areas there between. The first pattern is generally formed from the first protuberances and as such the elements forming the first pattern generally have a height (h1) greater than about 1.30 mm, such as from about 1.30 to about 1.50 mm and more preferably from about 1.35 to about 1.45 mm. Further, in particularly preferred embodiments, the first pattern is continuous along at least one dimension of the engraved roll and even more preferably is a regular, repeating pattern disposed across at least one dimension of the engraved roll.

Between adjacent linear elements forming the first pattern are land areas. In this manner the land areas are generally at least partially bound by the linear elements forming the first pattern. The land areas may be continuous or discontinuous within a given dimension of the engraved roll depending on the arrangement of linear elements forming the first pattern. Disposed within the land areas is a second pattern formed from the second protuberances. The protuberances forming the second pattern generally have a height (h2) less than about 1.25 mm, such as from about 0.90 to about 1.25 mm, and more preferably from about 0.95 to about 1.20 mm. The elements forming the second pattern may comprise linear or non-linear elements. Further, in certain preferred embodiments the second pattern may be a regular pattern repeated across the land areas in one dimension of the engraved roll.

The spaced apart linear elements forming the first pattern comprises from at least about 5 percent of the surface area of the engraved roll, such as from about 5.0 to about 40 percent, more preferably from about 10 to about 30 percent of the surface area of the engraved roll. On the other hand the second pattern comprises from at least about 1.0 percent of the surface area of the engraved roll, such as from about 1.0 to about 30 percent, more preferably from about 5.0 to about 25 percent of the surface area of the engraved roll.

Figure 3A:
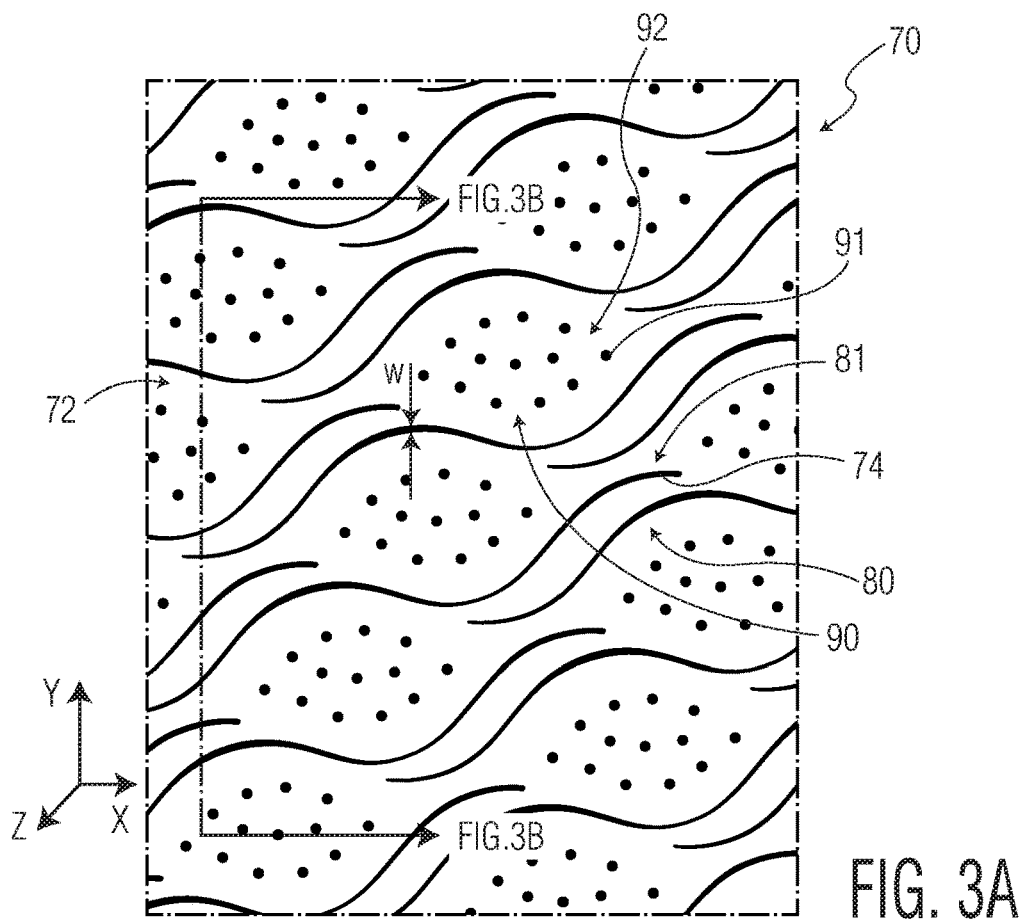
FIG. 3A is a top plane view of an engraved roll according to one embodiment of the present invention and FIG. 3B is a cross-sectional view of a portion of the engraved roll shown in FIG. 3A.

With reference now to FIG. 3A, one embodiment of an engraved roll 70 useful in the present invention is illustrated. The engraved roll 70 has an outer surface 72 that is brought into contact with the fibrous structure during manufacture. The roll 70 further comprises a first pattern 80 comprising a regular repeating motif 81 comprising a curvilinear line element 74. The curvilinear line element 74 has a first dimension in a first direction (x) in the plane of the outer surface 72, a second dimension in a second direction (y) in the plane of the outer surface 72, the first and second directions (x,y) being at right angles to each other. The extension of the curvilinear line element 74 in the first direction (x) generally defines the element length (l), while its extension in the second direction (y) generally defines the element width (w).

Figure 3B:
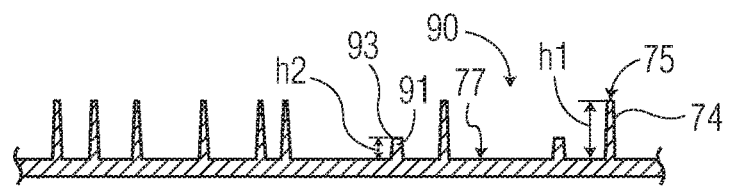

Turning now to FIG. 3B, which is a cross-section view of the engraved roll 70, the curvilinear element 74 further comprises a top surface 75 which extends in the z-direction above the landing area plane 77 to provide the linear element with a height (h1). As discussed above, h1 is generally greater than about than about 0.5 mm, such as from about 0.5 to about 3.5 mm, more preferably from about 0.5 to about 2.5 mm, and in a particularly preferred embodiment between from about 0.7 to about 1.5 mm.

The spacing and arrangement of the elements forming the first pattern may vary depending on the desired tissue product properties and appearance. In one embodiment a plurality of linear elements extend continuously throughout one dimension of the engraved roll and each element in the plurality is spaced apart from the adjacent element. Thus, the elements may be spaced apart across the entire cross-machine direction of the roll, may endlessly encircle the roll in the machine direction, or may run diagonally relative to the machine and cross-machine directions. Of course, the directions of the elements alignments (machine direction, cross-machine direction, or diagonal) discussed above refer to the principal alignment of the elements. Within each alignment, the elements may have segments aligned at other directions, but aggregate to yield the particular alignment of the entire elements.

In addition to varying the spacing and arrangement of the linear elements forming the first pattern, the shape of the element may also be varied. For example, in one embodiment, the linear elements forming the first pattern are curvilinear and more preferably sinusoidal and are arranged substantially parallel to one another such that none of the elements intersect one another. In other embodiments the linear elements may occur as wave-like patterns that are arranged in-phase with one another such that the spacing between adjacent elements is substantially constant. In other embodiments the linear elements may form a wave pattern where adjacent elements are offset from one another.

Regardless of the particular first element shape and the resulting motif and pattern, or whether adjacent elements within a pattern are in or out of phase with one another, it is generally preferred that there is some portion of the roll surface along which adjacent elements within a pattern are separated from one another. In this manner the roll comprises land areas between adjacent elements. In a particularly preferred embodiment the first pattern comprises a plurality of spaced apart linear elements where the pattern is disposed continuously across both the x and y dimensions of the engraved roll surface and adjacent linear elements are spaced apart from one another in the y-dimension at least about 1.0 cm, such as from about 1.0 to about 5.0 cm and more preferably from about 2.0 to about 4.0 cm.

While in certain embodiments the linear elements forming the first pattern are continuous the invention is not so limited. In other embodiments the elements may be discrete. For example, an engraved roll, such as that illustrated in FIG. 3A, may comprise a motif repeated throughout at least one dimension of the engraved roll. As further illustrated in FIG. 3A, the motif may comprise two curvilinear elements having similar dimensions—width, depth and length. The motif may be repeated to form a pattern. The curvilinear elements of a given motif do not insect or contact one another. Further, the curvilinear elements of adjacent motifs are not uniformly spaced from one another in the y-dimension. Rather, because of the element's curvilinear shape, the y-dimension distance between adjacent linear elements changes. Preferably however, the motifs are spaced apart at least about 1.0 cm, such as from about 1.0 to about 5.0 cm and more preferably from about 2.0 to about 4.0 cm, so as to define land areas between adjacent elements.

As further illustrated in FIG. 3A, within the land areas 90 a second pattern 92 is provided. The second pattern 92 comprises second protuberances 91. In the embodiment illustrated in FIG. 3A, the second protuberances 91 are discrete and spaced apart from one another and form a geometric second pattern 92. Each protuberance 91 extends outwardly from the landing area plane 77 and terminates at a distal end 93. The distance in the z-direction between the plane 77 and the distal end 93 is the height of the second protuberance (h2).

The illustrated protuberances of FIGS. 3A and 3B have a round horizontal (relative to the plane of the roll) cross-sectional shape, however, the shape is not so limited. The protuberance may have any number of different horizontal cross-sectional shapes such as, for example, rectangular, circular, oval, polygonal or hexagonal shape. A particularly preferred protuberance has planar sidewalls which are generally perpendicular to the plane of the engraved roll. Alternatively, the protuberances may have a tapered lateral cross-section formed by sides that converge to yield a protuberance having a base that is wider than the distal end.

The individual protuberances may be arranged in any number of different manners to create a decorative pattern. In one particular embodiment, such as that illustrated in FIG. 3A, protuberances 91 are spaced and arranged in a non-random pattern so as to create a diamond-like design 92. In the illustrated embodiment spaced between the linear elements 74 forming the first pattern 80 are land areas 90 that provide a visually distinctive interruption. Further, the second pattern 92 may be repeated through all or only a portion of the land areas in one or more dimensions of the roll.

Figure 4:
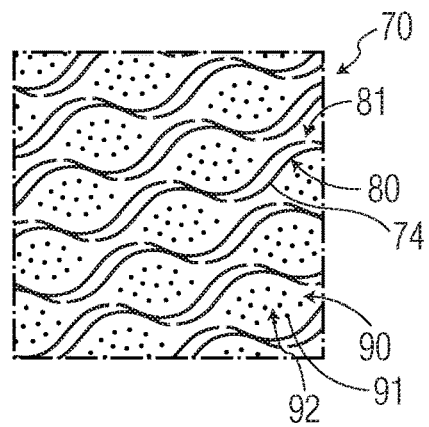
FIG. 4 is a top plane view of an engraved roll according to one embodiment of the present invention.
Figure 5A:
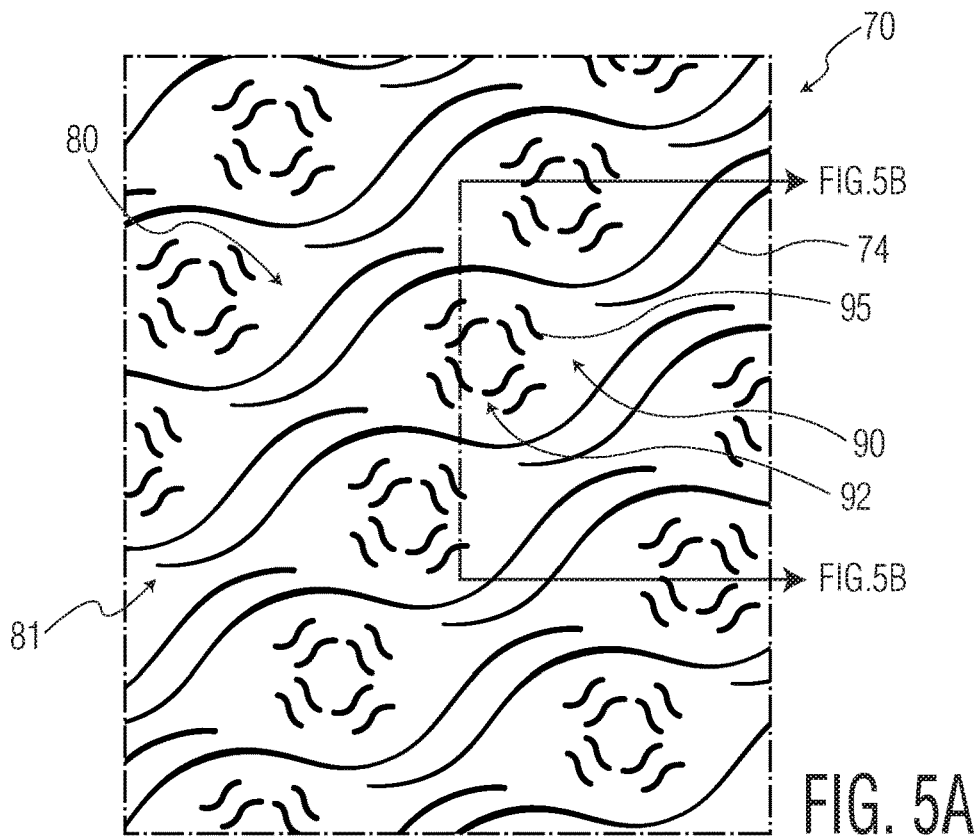
FIG. 5A is a top plane view of an engraved roll according to one embodiment of the present invention and FIG. 5B is a cross-sectional view of a portion of the engraved roll shown in FIG. 5A.
Figure 5B:
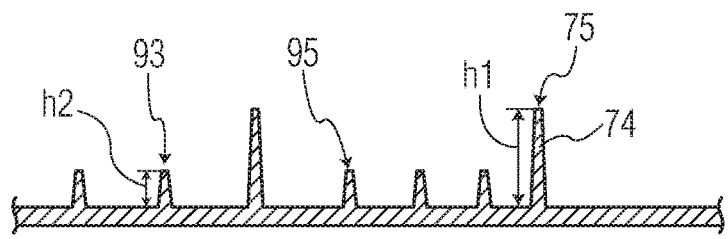
Figure 6:
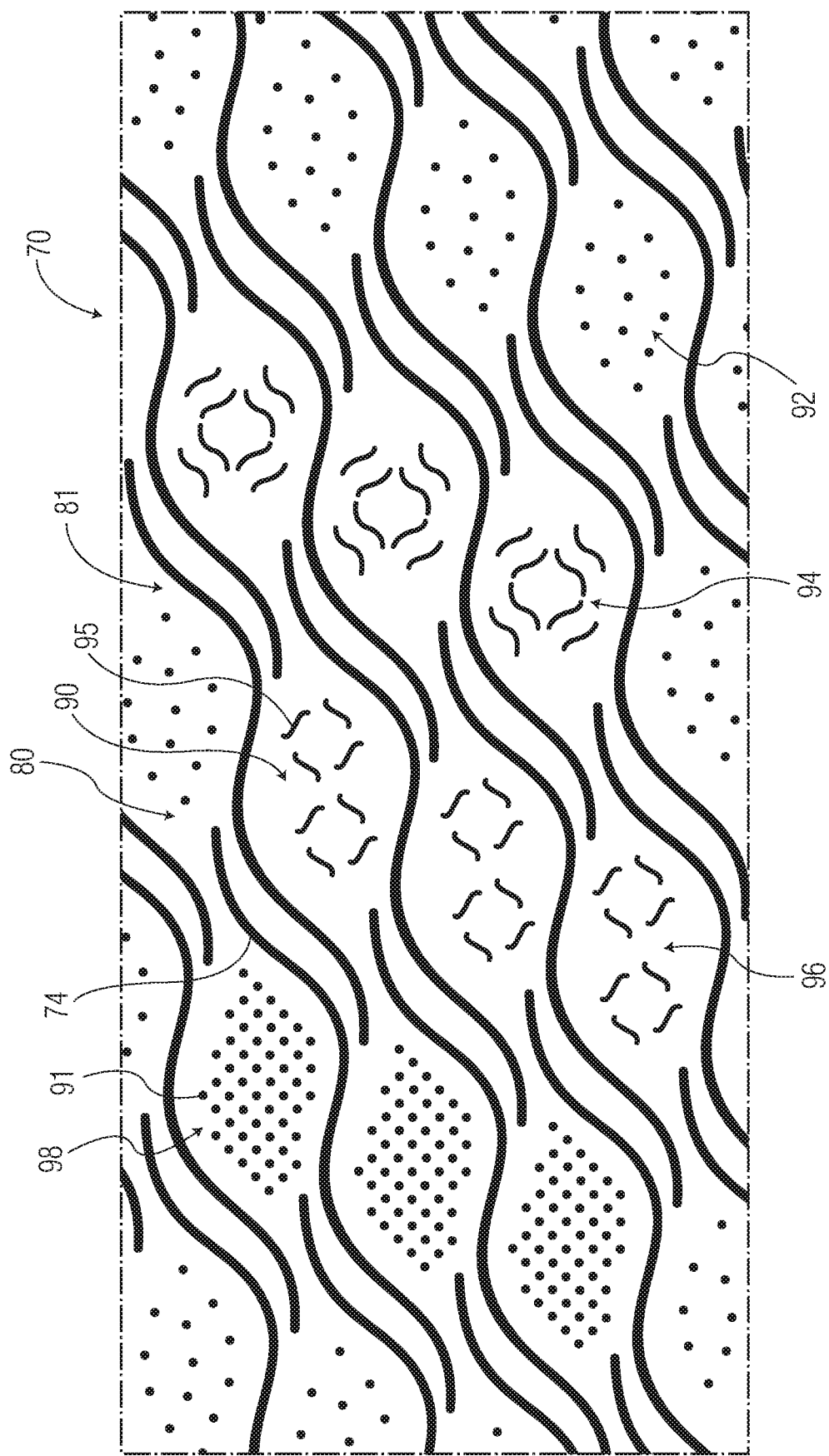
FIG. 6 is a top plane view of an engraved roll according to one embodiment of the present invention.

Additional embossing patterns having first and second protuberances of differing heights and forming different patterns useful in the present invention are illustrated in FIGS. 4-6. The engraved roll 70 shown in FIG. 4 comprises a first pattern 80 consisting of a repeating S-shaped motif 81 formed from a pair of curvilinear elements 74. The roll 70 further comprises a second pattern 92 comprising protuberances 91 arranged in the shape of diamonds, which are bounded by the curvilinear elements 74 of the first pattern 80. The curvilinear elements 74 forming the first pattern 80 have a first height (h1) that is greater than the height (h2) of the protuberances 91 forming the second pattern 92. Without being bound by theory, it is believed that use of the illustrated embossing roll results in a tissue product having reduced tensile strength and a soft handfeel and a visually attractive embossed pattern resulting from the first embossing pattern. The second pattern is not visibly discernable in the resulting tissue product.

FIG. 5A illustrates another engraved roll 70 useful in the present invention. Here, the engraved roll 70 comprises a first pattern 80 formed from a repeated motif 81 comprising discrete curvilinear elements 74. The roll 70 further comprises a second pattern 92 comprising curvilinear elements 95. The second pattern 92 is bounded by the curvilinear elements 74 of the first pattern 80 and disposed within a land area 90 there-between. The curvilinear elements 74 forming the first pattern 80 have a first height (h1) that is greater than the height (h2) of the curvilinear elements 95 forming the second pattern 92 (illustrated in detail in FIG. 5B).

FIG. 6 illustrates yet another engraved roll 70 useful in the present invention. Here, the engraved roll 70 comprises a first pattern 80 consisting of a repeating motif 81 of discrete curvilinear elements 74. The curvilinear elements 74 define land areas 90 there-between. Within the land areas 90 a second 92, third 94, fourth 96, and fifth 98 pattern are disposed. The second through fifth patterns 92, 94, 96, 98 are formed from protuberances 91 (patterns 92, 98) or linear elements 95 (patterns 94, 96). Generally the height of the protuberances and linear elements forming the second through fifth patterns are less than the linear elements forming the first pattern. In this manner, in-use, the engraved roll may impart only the first pattern to a tissue ply. The height of the protuberances 91 and linear elements 95 forming the second through fifth patterns 92, 94, 96, 98 may vary relative to one another, however, they are always less than the height of the linear elements forming the first pattern.

Figure 7A:
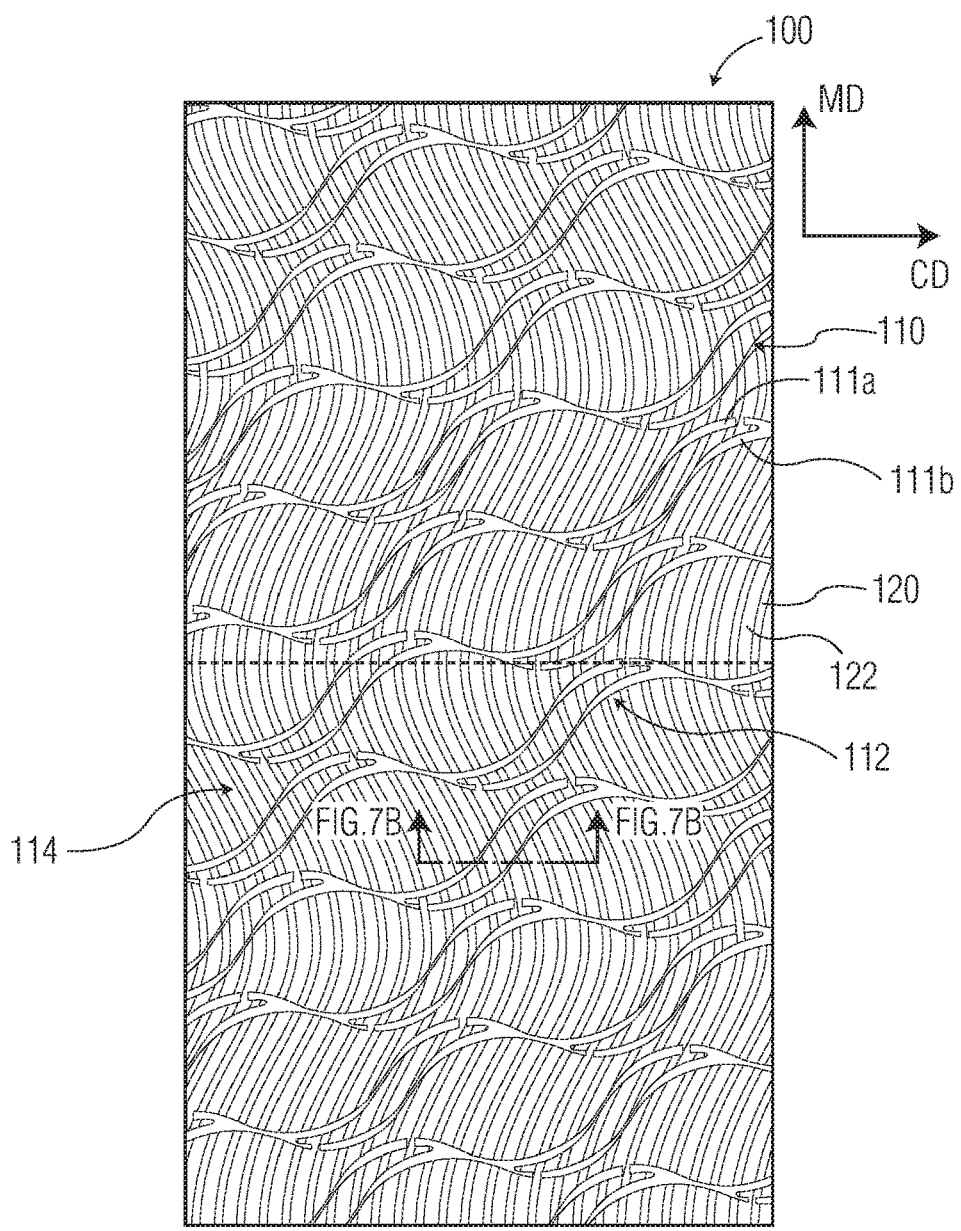
FIG. 7A is a top plane view of an embossed tissue product according to one embodiment of present invention and FIG. 7B is a cross-sectional view through the line 7B-7B.
Figure 7B:
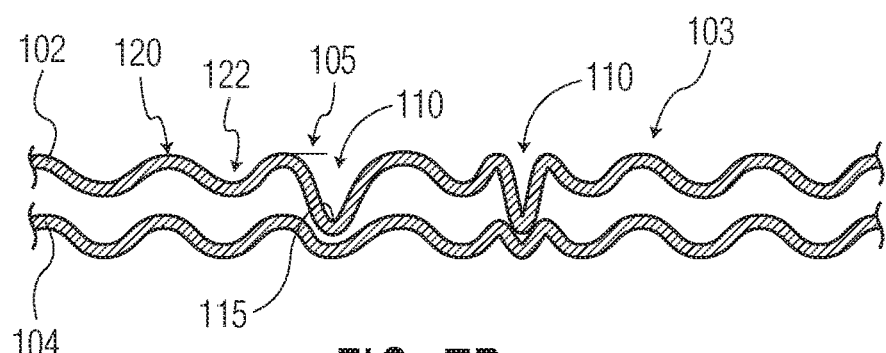

Now with reference to FIGS. 7A and 7B, one embodiment of a fibrous structure 100 prepared according to the present invention is illustrated. The fibrous structure 100 comprises a first 102 and second 104 tissue ply (shown in detail in FIG. 7B) and has two principle dimensions—a machine direction ("MD"), which is the direction substantially parallel to the principal direction of travel of the tissue web during manufacture and a cross-machine direction ("CD"), which is generally orthogonal to the machine direction. The fibrous structure has an upper surface 103 with an upper surface plane 105. The upper surface has a three dimensional shape defined by elevated ridges 120 and valleys 122 there-between. While the instant fibrous structure is illustrated as having alternating peaks and valleys which define the surface and bottom planes and provide the structure with a textured surface, the invention is not so limited. One skilled in the art will appreciate that there are numerous structures which may be employed to yield a fibrous structure having a three-dimensional topography with z-directional elevation differences.

The fibrous structure 100 further comprises an embossment 110. The illustrated embossment 110 comprises generally a pair of curvilinear elements 111a, 111b that form a motif 112 and repeat to form an embossing pattern 114. The motifs 112 are disposed in a repeated fashion continuously across the plane of the fibrous structure 100. The embossment 110 is formed by embossing the first tissue ply 102 according to the present invention and generally corresponds to a first embossing pattern design disposed on the patterned roll. As illustrated in FIG. 7B, the embossment 110 is a depression having a bottom surface 115 lying below the surface plane 105 of the first ply 102. The shape and depth of the embossment may be controlled by the shape and height of the first protuberance forming the embossment. The first ply 102 does not bear an embossment corresponding to the second pattern disposed on the patterned roll. Rather, embossing the first ply according to the present invention degrades the strength of the web and only imparts an embossing design corresponding to the first embossing pattern design.

Figure 8A:
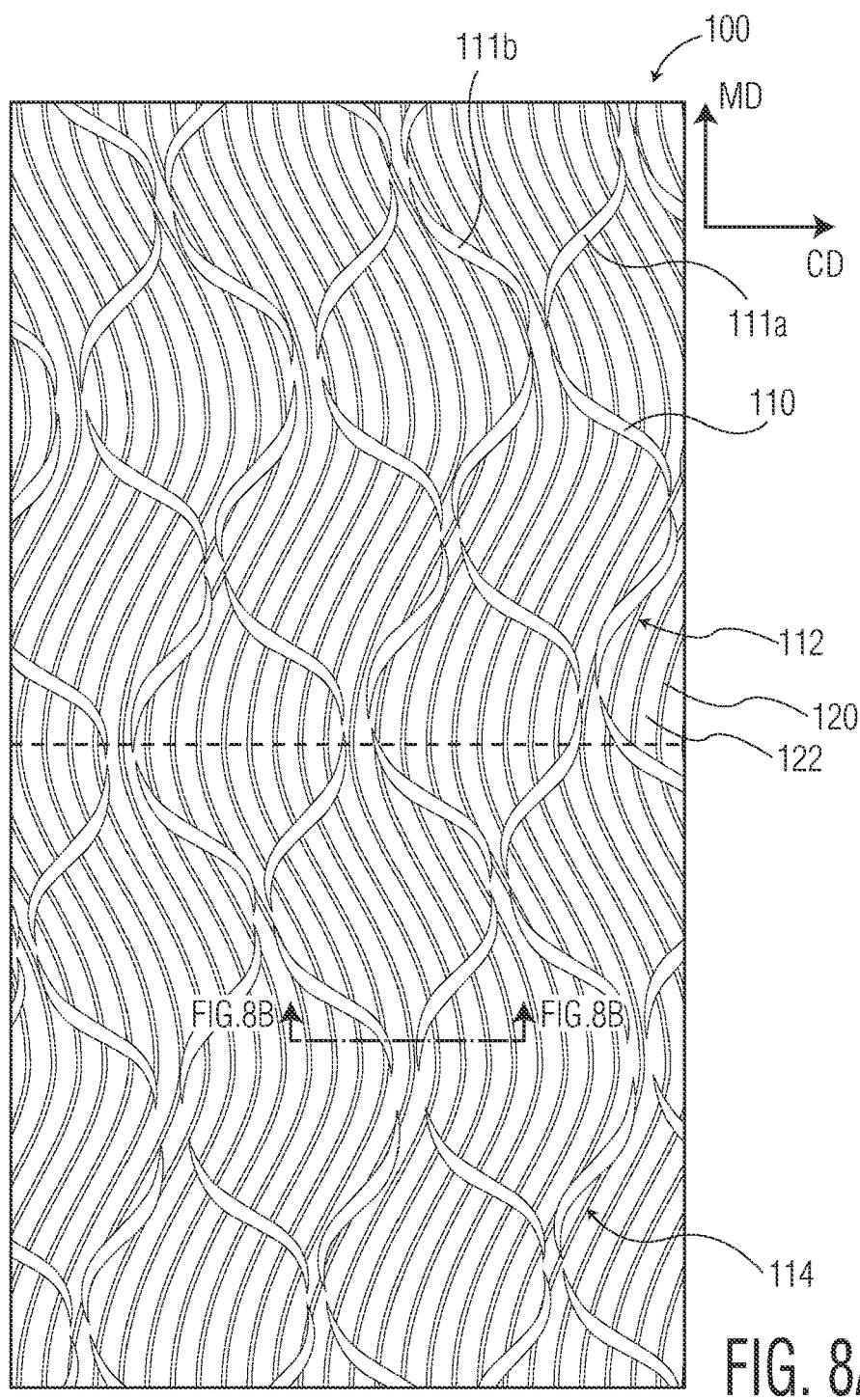
FIG. 8A is a top plane view of an embossed tissue product according to one embodiment of present invention and FIG. 8B is a cross-sectional view through the line 8B-8B.
Figure 8B:
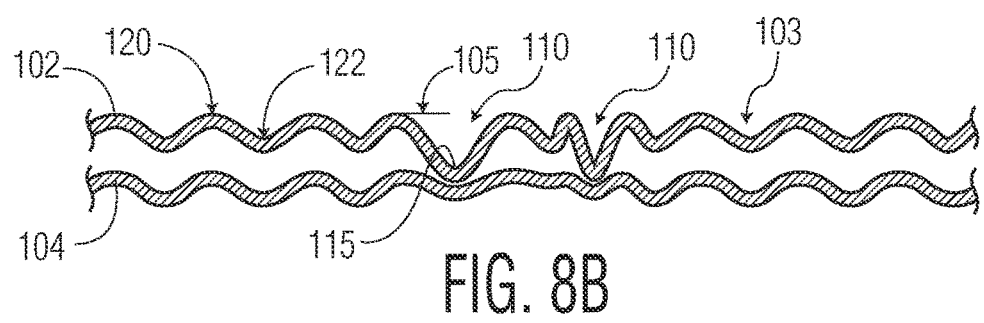

With reference now to FIGS. 8A and 8B yet another embodiment of a fibrous structure 100 prepared according to the present invention is illustrated. The fibrous structure 100 comprises a first 102 and second 104 tissue ply (shown in detail in FIG. 8B). The fibrous structure has an upper surface 103 with an upper surface plane 105. The upper surface has a three dimensional shape defined by elevated ridges 120 and valleys 122 there-between. The first ply 102 further comprises an embossment 110, which in the present embossment, comprises discrete curvilinear elements 111a, 111b that form a motif 112 and repeat to form an embossing pattern 114. The motifs 112 are disposed in a repeated fashion continuously the plane of the fibrous structure 100. The embossment is formed by embossing the first tissue ply according to the present invention and generally corresponds to the first embossing pattern design.

With further reference to FIG. 8A, curvilinear line elements 111a, 111b are similarly sized in terms of width, length and depth. In certain embodiments the embossment depth is greater than about 0.5 mm, such as from about 0.5 to about 2.0 mm. The depth is generally measured as the distance between the bottom surface 115 of the embossment and the surface plane 105. Just as the relative size of the line elements may be varied, the spacing and arrangement of the continuous line elements may also vary depending on the desired tissue product properties and appearance. In one embodiment a plurality of line elements extend continuously throughout one dimension of the fibrous structure and each element in the plurality is spaced apart from adjacent element. Thus, the elements may be spaced apart across the entire cross-machine direction of the fibrous structure or may run diagonally relative to the machine and cross-machine directions. Of course, the directions of the line elements alignments (machine direction, cross-machine direction, or diagonal) discussed above refer to the principal alignment of the elements. Within each alignment, the elements may have segments aligned at other directions, but aggregate to yield the particular alignment of the entire elements.

As further illustrated in FIG. 8A the resulting fibrous structure comprises a land area, which is unembossed and defined by being substantially surrounded by the curvilinear line elements 111a, 111b. In the embodiment shown in FIG. 8A, the land areas are discrete and surrounded by four discrete curvilinear elements 111a, 111b. These curvilinear embossments are disposed discontinuously to surround the discrete, distinctive land area, however, they have the visual appearance of being substantially continuous. In other embodiments the curvilinear embossments may be continuous. Although the discrete, distinctive land area is not surrounded by a closed line, the discrete, distinctive land area can be viewed as forming a shape surrounded by an outline. In this manner the land areas are substantially surrounded by a plurality of embossed elements that define a boundary between the discrete, distinctive land areas, which are unembossed. The discrete, distinctive land areas generally correspond to the portion of the web that is contacted by the second pattern comprising embossing elements having a height that is less than the embossing elements forming the first pattern. Despite being contacted by the embossing elements of the second pattern, the resulting web is not imparted with a corresponding pattern.

Tissue webs and products produced according to the present invention not only have an embossing element that may be aesthetically pleasing to a consumer, they may also have favorable physical properties, such as sufficient strength to withstand use without being stiff or rough. Accordingly, in one embodiment the present invention provides a tissue product comprising a single-ply tissue product comprising a fibrous structure having a textured top surface lying in a surface plane, a bottom surface lying in a bottom plane, and an embossing element lying in an embossing element plane, wherein there is a z-directional height difference between the surface and bottom planes and the embossing element plane lies between the surface and bottom planes and wherein the tissue product has a basis weight from about 10 to about 100 gsm, and more preferably from about 15 to about 60 gsm and a sheet bulk greater than about 5.0 cc/g and more preferably greater than about 10.0 cc/g, such as from about 5.0 to about 20.0 cc/g.

In addition to having the foregoing basis weights and sheet bulks, tissue products prepared according to the present invention may have a geometric mean tensile (GMT) greater than about 1,000 g/3", such as from about 1,000 to about 1,500 g/3", and more preferably from about 1,000 to about 1,200 g/3". At these tensile strengths the tissue webs and products have relatively low geometric mean modulus, expressed as GM Slope, so as to not overly stiffen the tissue product. Accordingly, in certain embodiments, tissue webs and products may have a GM Slope less than about 20 kg, and more preferably less than about 15 kg, and still more preferably less than about 10 kg.

In one particularly preferred embodiment the present invention provides a rolled bath tissue product comprising a single-ply through-air dried tissue web having a basis weight from about 20 to about 45 gsm, GMT from about 500 to about 1,200 g/3", a GM Slope less than about 12 kg and a GM Stretch greater than about 10 percent and still more preferably greater than about 12 percent, such as from about 10 to about 15 percent. The foregoing tissue web further comprises a textured top surface lying in a surface plane, a bottom surface lying in a bottom plane, and an embossment lying in an embossment plane, wherein there is a z-directional height difference between the surface and bottom planes and the embossing element plane lies between the surface and bottom planes.

When two or more inventive tissue webs are joined together the resulting multi-ply tissue product generally has a basis weight greater than about 40 gsm, such as from about 40 to about 80 gsm, and more preferably from about 50 to about 60 gsm. At these basis weights the tissue products generally have calipers greater than about 400 μm, such as from about 400 to about 600 μm, and more preferably from about 450 to about 550 μm. The tissue products further have sheet bulks greater than about 5.0 cc/g, such as from about 5.0 to about 20.0 cc/g.

While being bulky and substantive enough to have multiple applications the tissue products are also strong enough to withstand use, but have relatively low modulus so as not to be overly stiff. For example, in certain embodiments the foregoing multi-ply tissue products have a GMT greater than about 800 g/3", such as from about 800 to about 1,200 g/3", and more preferably from about 900 to about 1,100 g/3". At these tensile strengths the tissue products generally have GM Slopes less than about 15.0 kg/3", such as from about 10.0 to about 15.0 kg/3", and more preferably from about 12.0 to about 14.0 kg/3".

Test Methods

Sheet Bulk

Sheet Bulk is calculated as the quotient of the dry sheet caliper (μm) divided by the bone dry basis weight (gsm). Dry sheet caliper is the measurement of the thickness of a single sheet of tissue product (comprising all plies) measured in accordance with TAPPI test method T402 using a ProGage 500 Thickness Tester (Thwing-Albert Instrument Company, West Berlin, N.J.). The micrometer has an anvil diameter of 2.22 inches (56.4 mm) and an anvil pressure of 132 grams per square inch (per 6.45 square centimeters) (2.0 kPa).

Tensile

Tensile testing was done in accordance with TAPPI test method T-576 "Tensile properties of towel and tissue products (using constant rate of elongation)" wherein the testing is conducted on a tensile testing machine maintaining a constant rate of elongation and the width of each specimen tested is 3 inches. More specifically, samples for dry tensile strength testing were prepared by cutting a 3±0.05 inch (76.2±1.3 mm) wide strip in either the machine direction (MD) or cross-machine direction (CD) orientation using a JDC Precision Sample Cutter (Thwing-Albert Instrument Company, Philadelphia, Pa., Model No. JDC 3-10, Serial No. 37333) or equivalent. The instrument used for measuring tensile strengths was an MTS Systems Sintech 11S, Ser. No. 6233. The data acquisition software was an MTS TestWorks® for Windows Ver. 3.10 (MTS Systems Corp., Research Triangle Park, NC). The load cell was selected from either a 50 Newton or 100 Newton maximum, depending on the strength of the sample being tested, such that the majority of peak load values fall between 10 to 90 percent of the load cell's full scale value. The gauge length between jaws was 4±0.04 inches (101.6±1 mm) for facial tissue and towels and 2±0.02 inches (50.8±0.5 mm) for bath tissue. The crosshead speed was 10±0.4 inches/min (254±1 mm/min), and the break sensitivity was set at 65 percent. The sample was placed in the jaws of the instrument, centered both vertically and horizontally. The test was then started and ended when the specimen broke. The peak load was recorded as either the "MD tensile strength" or the "CD tensile strength" of the specimen depending on the direction of the sample being tested. Ten representative specimens were tested for each product or sheet and the arithmetic average of all individual specimen tests was recorded as the appropriate MD or CD tensile strength of the product or sheet in units of grams of force per 3 inches of sample. The geometric mean tensile (GMT) strength was calculated and is expressed as grams-force per 3 inches of sample width. Tensile energy absorbed (TEA) and slope are also calculated by the tensile tester. TEA is reported in units of gm·cm/cm². Slope is recorded in units of kg. Both TEA and Slope are directional dependent and thus MD and CD directions are measured independently. Geometric mean TEA and geometric mean slope are defined as the square root of the product of the representative MD and CD values for the given property.

Multi-ply products were tested as multi-ply products and results represent the tensile strength of the total product. For example, a two-ply product was tested as a two-ply product and recorded as such. A basesheet intended to be used for a two-ply product was tested as two plies and the tensile recorded as such. Alternatively, a single ply may be tested and the result multiplied by the number of plies in the final product to get the tensile strength.

EXAMPLES

Base sheets were made using a through-air dried papermaking process commonly referred to as "uncreped through-air dried" ("UCTAD") and generally described in U.S. Pat. No. 5,607,551, the contents of which are incorporated herein in a manner consistent with the present disclosure. Base sheets with a target bone dry basis weight of about 44 grams per square meter (gsm) were produced. The base sheets were then converted and spirally wound into rolled tissue products.

In all cases the base sheets were produced from a furnish comprising northern softwood kraft and eucalyptus kraft using a layered head box fed by three stock chests such that the webs having three layers (two outer layers and a middle layer) were formed. The two outer layers comprised eucalyptus (each layer comprising 30 percent weight by total weight of the web) and the middle layer comprised softwood and eucalyptus. The amount of softwood and eucalyptus kraft in the middle layer was maintained for all inventive samples—the middle layer comprised 29 percent (by total weight of the web) softwood and 11 percent (by total weight of the web) eucalyptus. Strength was controlled via the addition of starch and/or by refining the furnish.

The tissue web was formed on a Voith Fabrics TissueForm V forming fabric, vacuum dewatered to approximately 25 percent consistency and then subjected to rush transfer when transferred to the transfer fabric. The transfer fabric was the fabric described as "Fred" in U.S. Pat. No. 7,611,607 (commercially available from Voith Fabrics, Appleton, Wis.). The web was then transferred to a through-air drying fabric comprising a printed silicone pattern disposed on the sheet contacting side. The silicone formed a wave-like pattern on the sheet contacting side of the fabric. The pattern properties are summarized in Table 1, below.

TABLE 1

| Element Height (mm) | Element Angle | Element Wavelength (mm) | Element Amplitude (mm) | Elements Density (#/cm) |
|---|---|---|---|---|
| 0.8 | 11.3 | 100 | 10 | 2.44 |

Transfer to the through-drying fabric was done using vacuum levels of greater than 10 inches of mercury at the transfer. The web was then dried to approximately 98 percent solids before winding. Table 2 summarizes the physical properties of the base sheet.

TABLE 2

| Base Sheet BW (gsm) | Base Sheet Caliper (μm) | Base Sheet Bulk (cc/g) | Base Sheet GMT (g/3") |
|---|---|---|---|
| 25.13 | 1008 | 40.1 | 1324 |

The base sheet, prepared as described above, was converted into a two-ply rolled bath tissue product. Specifically, base sheet was calendered using one or two conventional polyurethane/steel calenders comprising a 40 P&J polyurethane roll on the air side of the sheet and a standard steel roll on the fabric side at a load of 100 pli. The calendered base sheet was converted into a two-ply rolled tissue products substantially as illustrated in FIG. 1, by embossing a first ply and then bringing the embossed ply into facing arrangement with a second ply and laminating the plies to form a two-ply tissue product. Various engraved rolls were evaluated to assess their effect on the resulting tissue product properties. The properties of the engraved rolls are summarized in Table 3, below, along with the nip widths. The two-ply tissue product was then converted into a roll of bath tissue and subjected to physical testing, the results of which are shown in Table 4, below.

TABLE 3

Figure 9:
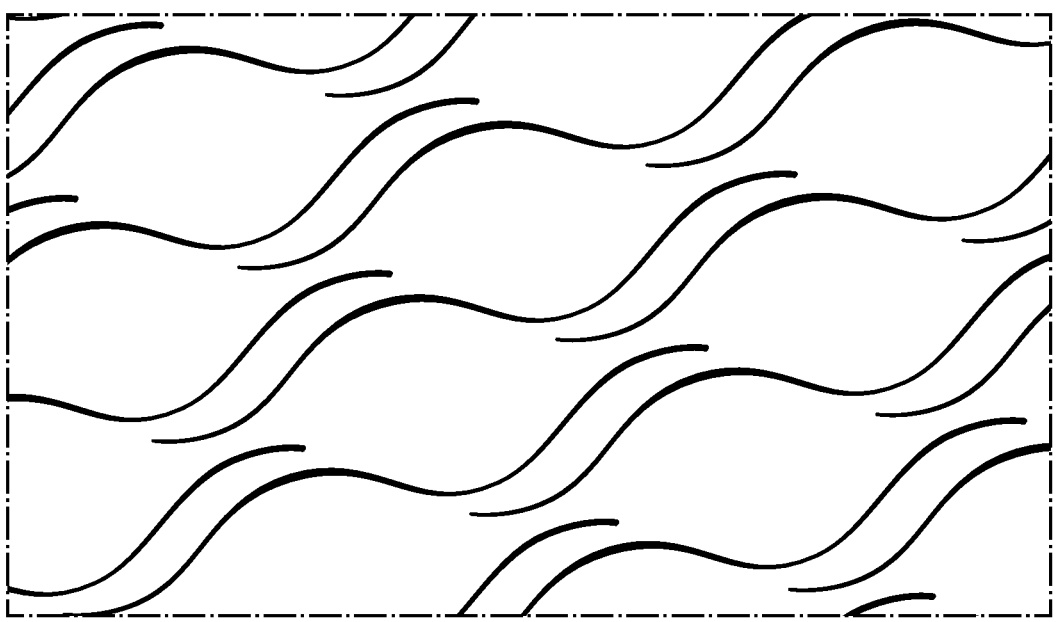
FIG. 9 is an illustration of an engraved roll used to produce tissue products according to the example.
Figure 10:
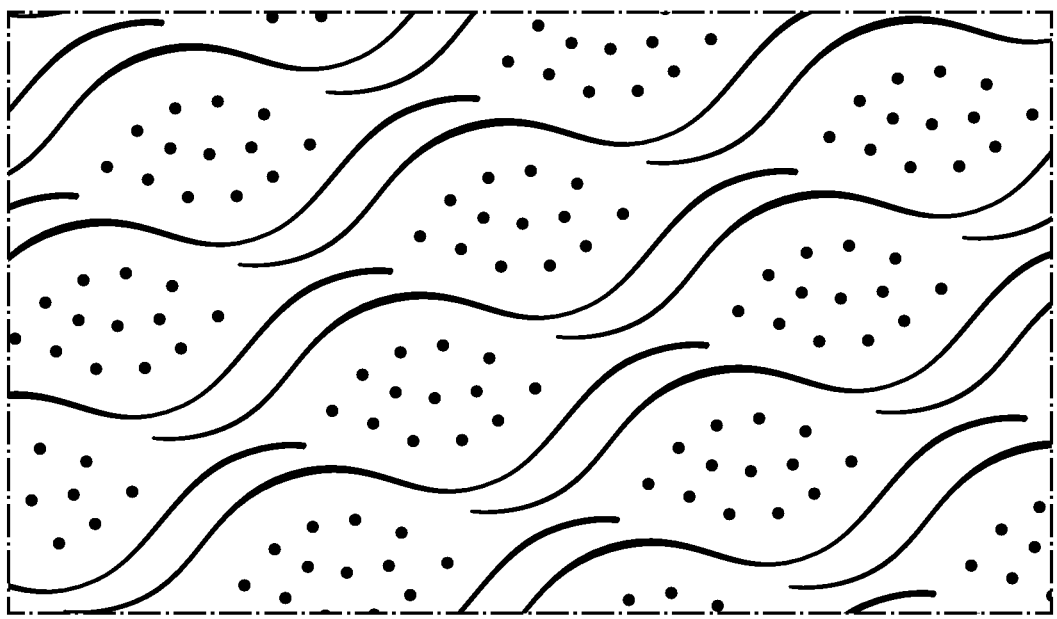
FIG. 10 is an illustration of an engraved roll used to produce tissue products according to the example.

| Product | Engraved Roll Pattern | First Pattern Element Height | Second Pattern Element Height | Engraved Roll/ Impression Roll Nip Width |
|---|---|---|---|---|
| 1 | FIG. 9 | 1.475 mm (0.058") | 1.22 mm (0.048") | 20 mm |
| 2 | FIG. 10 | 1.475 nm (0.058") | — | 20 mm |
| 3 | FIG. 9 | 1.475 mm (0.058") | 1.22 mm (0.048") | 26 mm |
| 4 | FIG. 10 | 1.475 mm (0.058") | — | 26 mm |

TABLE 4

| Product | BW (gsm) | Caliper (μm) | Sheet Bulk (cc/g) | GMT (g/3") | MD:CD Tensile Ratio | MD Tensile (g/3") | MD Stretch (%) | CD TEA |
|---|---|---|---|---|---|---|---|---|
| 1 | 44.24 | 541 | 12.2 | 1077 | 2.07 | 1550 | 14.6 | 5.32 |
| 2 | 43.59 | 544 | 12.5 | 1031 | 2.02 | 1464 | 13.5 | 5.11 |
| 3 | 44.67 | 559 | 12.5 | 1147 | 2.14 | 1681 | 14.0 | 5.47 |
| 4 | 44.56 | 546 | 12.3 | 1117 | 2.14 | 1635 | 13.3 | 5.28 |

The presence of a second embossing pattern increased tensile degradation, but had minimal effect on basis weight, as illustrated in Table 5, below, which compares the various products to an unembossed, calendered, two-ply tissue product having a GMT of 1,333 g/3" and BW of 50.26 gsm. The tensile degradation was generally about 5 percent greater as a result of embossing the web with a pattern roll having a second embossing design according to the present invention. The second embossing design however, was not imparted to the finished tissue product.

TABLE 5

| Sample | GMT Degradation | BW Degradation |
|---|---|---|
| 1 | 19.2% | 12.0% |
| 2 | 13.9% | 11.1% |
| 3 | 22.6% | 13.3% |
| 4 | 16.2% | 11.3% |

We claim:

1. An embossed fibrous product made by a process comprising the steps of:
   a. providing a first and a second fibrous material web;
   b. providing an engraved roll having a first axis of rotation, the engraved roll comprising a first embossing element extending radially therefrom and forming a first embossing pattern and a second element extending radially therefrom and forming a second pattern, wherein the first embossing element has a greater radial height than the second element;
   c. providing an impression roll having a second axis of rotation and comprising a resilient surface engaging the first embossing element of the engraved roll so as to form a first nip there-between as the engraved roll and impression roll rotate relative to each other so as to bring the first embossing element into engagement with the resilient surface of the impression roll;
   d. passing the first fibrous web through the first nip;
   e. pressing the first web between the first and second elements and the resilient surface of the impression roll wherein pressing the first web between the first embossing element and the resilient surface of the impression roll forms a first embossment corresponding to the first embossing pattern to the first web and wherein pressing the first web between the second element and the resilient surface of the impression roll impresses the first web, but does not impart a second embossment to the first web corresponding to the second embossing pattern;
   f. providing a marrying roll having a third axis of rotation and having surface engaging the first element of the engraved roll so as to form a second nip there-between; and
   g. passing the first and the second webs through the second nip thereby forming a two-ply fibrous product having the first embossment corresponding to the first embossing pattern;
   wherein the two-ply fibrous product has a geometric mean tensile (GMT) from about 1,000 to about 1,200 g/3".

2. The embossed fibrous product of claim 1 having a sheet bulk from about 10.0 to about 15.0 cc/g.

3. The embossed fibrous product of claim 1 wherein the first and second plies are through-air dried tissue webs and the second ply is unembossed.

4. The embossed fibrous product of claim 1 having a first embossed pattern comprising a plurality of linear elements, the linear elements defining discrete land areas there-between, wherein the land areas are unembossed.

5. The embossed fibrous product of claim 4 wherein the unembossed land areas comprise at least about 30 percent of the product surface area.

6. The embossed fibrous product of claim 4 wherein the linear elements have a depth greater than at least about 0.5 mm.

7. A method of reducing the tensile strength of a multi-ply fibrous structure comprising the steps of:
   a. providing a first and second fibrous material web;
   b. providing an engraved roll having a first axis of rotation, the engraved roll comprising a first embossing element extending radially therefrom and forming a first embossing pattern and a second element extending radially therefrom and forming a second pattern, wherein the first embossing element has a greater radial height than the second element;
   c. providing an impression roll having a second axis of rotation and comprising a resilient surface engaging the first embossing element of the engraved roll so as to form a first nip there-between as the first and second rolls rotate relative to each other so as to bring the first embossing element into engagement with the resilient surface;
   d. passing the first fibrous web through the first nip;
   e. pressing the first web between the first and second elements and the resilient surface of the impression roll wherein pressing the first web between the first embossing element and the resilient surface of the impression roll forms a first embossment corresponding to the first embossing pattern on the first web and wherein pressing the first web between the second element and the resilient surface of the impression roll impresses the first web, but does not impart a second embossment to the first web corresponding to the second pattern;

f. providing a marrying roll having a third axis of rotation and having a surface engaging the first embossing element of the engraved roll so as to form a second nip there-between; and g. passing the first and the second webs through the second nip thereby forming a two-ply fibrous product having the first embossment corresponding to the first embossing pattern, but not the second embossing pattern; wherein a geometric mean tensile strength (GMT) of the two-ply fibrous product is at least about 20 percent less than a substantially identical unembossed two-ply fibrous product.

8. The method of claim 7 wherein the radial height of the first embossing element is at least about 15 percent greater than the radial height of the second element.

9. The method of claim 7 wherein the radial height of the first embossing element is from about 1.35 to about 1.45 mm and the radial height of the second element is from about 0.95 to about 1.20 mm.

10. The method of claim 7 wherein the first embossing element maintains contact with and deforms the surface of the resilient roll such that the intervening web is impressed and results in the first embossment having a depth greater than about 0.5 mm, and the second element maintains contact with and deforms the resilient surface of the impression roll such that the intervening web is impressed but does not result in an second embossment.

11. The method of claim 7 wherein the first embossing pattern comprises spaced apart linear elements defining discrete land areas there-between and the second embossing pattern comprises a plurality of discrete protuberances or linear elements disposed within the land areas.

* * * * *